J. E. HANZLIK.
PAY ROLL INSTRUMENT.
APPLICATION FILED FEB. 24, 1914.

1,258,894.

Patented Mar. 12, 1918.

Witnesses:

Inventor
John E. Hanzlik
Attorneys

UNITED STATES PATENT OFFICE.

JOHN E. HANZLIK, OF MADISON, WISCONSIN.

PAY-ROLL INSTRUMENT.

1,258,894.   Specification of Letters Patent.   Patented Mar. 12, 1918.

Application filed February 24, 1914. Serial No. 820,433.

*To all whom it may concern:*

Be it known that I, JOHN E. HANZLIK, a citizen of the United States, residing at Madison, in the county of Dane and State of Wisconsin, have invented a certain new and useful Improvement in Pay-Roll Instruments, of which the following is a full, clear, concise, and exact description, reference being had to the accompanying drawings, forming a part of this specification.

My invention relates to negotiable interest bearing instruments of obligation, and more particularly to instruments of this class which may desirably be used in handling the payrolls of industrial and other institutions. The instruments of my invention in their preferred form comprise, first, a negotiable bank certificate evidencing the deposit of a definite sum of money and agreeing to pay therefor one of a number of (preferably increasing) specific amounts, the proper one of which is determined by the date on which payment is made, the amounts and certain date indicia being structurally arranged (preferably alternately at one end of the certificate) so that certain dates and certain amounts reciprocally index each other in a manner that enables the holder to see at a glance without computation the proper amount that will be paid on any given date, as well as the exact period during which each of the specific amounts is payable; second, a bank check drawn upon a bank adapted to be signed by a depositor and, if desired, having similar arrangement of value and date indicia; third, a statement of account of the employee to whom the instrument is to be delivered; and, fourth, a receipt form, all of said sections being detachably secured to one another.

In the accompanying drawing I have illustrated one form of the instrument in which section A is the bank's certificate of deposit. As will be apparent from the drawing, the bank certificate is provided with a space in which may be written or printed the name of the depositor, usually an employer, as for example, the Star Milling Company. When thus filled in, this savings certificate states that the Star Milling Company has deposited in the Manufacturers' National Bank of Cityville, Illinois, the sum of ten dollars, for which it will pay the bearer (unless otherwise ordered) the proper amount shown in the table for the date presented.

The several value amounts are arranged in a table in such relative position to certain date indicia that the proper amount payable on any given date is seen at a glance. It is further provided with printed directions and an order associated with a blank signature space, the effect of which is to make the instrument payable to order instead of to bearer after receiving the signature of any owner in the space provided. The instrument as issued is thus readily transferred from employer to employee and may thus pass from person to person by delivery until it falls into the hands of someone who, because of its appreciating value, may desire to keep it for a time, and that person is enabled by means of the order and signature space to make the instrument personal to himself.

Preferably at the right end of the certificate a table is provided in which alternating with blank spaces certain predetermined successively increasing amounts are printed, as, for example, $10.00, $10.10, $10.20, $10.30, $10.40, etc. It is intended that the blank spaces in this table will be filled with appropriate date indicia at the time the certificate is issued, so as to indicate the precise periods of time during which each of the amounts provided in the table will represent the value of the instrument. Thus, if it is predetermined that the instrument shall have a value at the end of three months that would represent interest at four per cent. per annum, the second space will be filled with a date three months later than the first space, which is also the date of the instrument. If it is predetermined that the instrument shall have a value at the end of seven months that will represent interest for the first three months at four per cent. and at three per cent. for the next four months, the third space will receive the date seven months after the date in the first space and four months after the date in the second space. In like manner, the other spaces may be filled in to give such rate or rates or combination of rates as may be desired.

Adjacent to the amount and date space table, is a series of braces or brackets so formed and arranged that each brace or bracket will embrace one indicium of value and also the immediately adjacent date spaces. These braces or brackets thus define a series of period spaces such that each date space except the first will index two value amounts and each value amount except the last will index two dates. Each date filled into a date space, therefore, serves a double purpose: First, it indicates the date upon which the period associated with one amount terminates; and second, it indicates the date upon which the period associated with the next succeeding amount begins.

This savings certificate will be signed by an officer of the bank and an appropriate space therefor is provided, as shown in the drawing.

Detachably secured to and thus made a part of the interest bearing savings certificate of deposit is a form B, in which may be filled the data of a workman's time account with the Star Milling Company. Thus, the form which I have illustrated provides a space in which may be written the name of the employee. There are spaces in which may be filled the date of the commencement of the payroll period and the date of the end of the payroll period. There is a blank in which may be filled the total number of hours of work and the rate per hour and the total amount of wages due the workman. There is a space also for deductions which may be necessary as a result of partial payments on account, etc. There is a further space in which the balance due may be written, all as illustrated in section B of the accompanying drawing.

Detachably secured to the other sections of the instrument is a section marked C. This is a pay check intended to be signed by an officer of the Star Milling Company. It directs the Manufacturers' Bank to pay to the bearer the proper amount shown in the table for the date presented.

The fourth section of the instrument comprises a detachable receipt form D. This form recites the fact that the workman acknowledges payment of his wages in full to a date to be filled in in an appropriate blank. As shown, the receipt form is provided with a blank line in which the employee may sign his name upon the delivery of the instrument to him. It contains also, however, a space for the receipt of a finger print impression. This space may be sensitized so that the natural moisture of the hand will effect the necessary imprint or this space may be non-sensitized, in which case the space will receive a deposit of ink or other pigment transferred from the fingers to the appropriate space upon the receipt form.

These instruments may be used in the following manner: By arrangement between the Star Milling Company and the Manufacturers' National Bank, the bank furnishes the employer with these instruments, which are in blank, except that savings certificates of deposit are signed by the officer or officers of the bank. The date of issue and the critical dates showing the beginning and ending dates of the several periods are also stamped in the spaces between the indicia of value. These savings certificates are issued and printed preferably in even amounts, as, for example, $1.00, $2.00, $5.00, $10.00, $20.00, etc. The Star Milling Company has an arrangement whereby it pays approximately forty per cent. of its wages in these savings certificates. The Star Milling Company will advise the bank of the total amount and the denominations of the savings certificates which it will desire to issue in meeting its payroll upon a certain date, as, for example, July 18, 1913. Upon the 18th of July, 1913, the bank will charge its depositor, the Star Milling Company, with the total amount of the savings certificates issued to the Star Milling Company upon that date.

The Star Milling Company will fill in the statement of the account of a workman in the form B of each of the instruments. It will fill in the pay check with the amount of the difference between the immediate value of savings certificate and the total amount of the workman's wages. For instance, supposing the workman's wages total $24.40, and the certificate issued has an initial value of $10.00, $14.40 will be the initial value of the pay check. The Star Milling Company will also fill in the other blanks of the table forming a part of the check with the total of the principal and interest at a rate or rates to be determined by the Star Milling Company at and between various dates in the future.

The Star Milling Company also fills in the necessary blanks in the receipt form. When the pay clerk pays the workmen, he delivers each instrument to the proper workman. John Smith, for example, is handed the instrument which is illustrated in the drawing, whereupon John Smith signs the receipt form or impresses or imprints his Bertillon signature upon the receipt form, as indicated in the drawing. The pay clerk detaches the receipt form and retains it as a record of the payment to John Smith. The statement of account is available to John Smith, who may find this statement of value in checking the correctness of the amount of payment due him.

John Smith can immediately present the pay check to be cashed at the bank and the bank will cash this check if the Star Milling Company has on deposit the funds with which to meet the check. The pay check does not, however, represent the obligation of the bank except as it may have funds to the credit of the Star Milling Company with which to meet the check. It is intended that the workman may hold this pay check to be cashed at some future date, if he so desires. In so doing, however, he assumes whatever risk there may be as to the continuing solvency of the Star Milling Company.

The savings certificate, however, is an obligation of the bank and it may safely be assumed that the bank will be able to meet this obligation upon demand. If John Smith is fearful lest he may lose the certificate of deposit, he may sign his name in the blank order space provided, after which the certificate becomes transferable by indorsement only.

The sections marked B, C and D in the drawing are preferably imprinted in large figures and in dull color with figures indicative of the amount of the principal represented by the savings certificate attached thereto.

These instruments of my invention are highly useful in handling large payrolls. By use of the finger print receipt form, the work of distributing the pay checks and procuring acknowledgments of receipt therefor can be handled very rapidly. Since the principal amount represented by the payroll check bears interest, there is an encouragement to the workmen to delay cashing it, and, to the extent that the cashing of these checks is delayed, the Star Milling Company maintains its resources of cash until the predetermined date marked upon the instrument which determines when the issued certificates are to be charged against it by the bank. The combination of the statement of account with the other sections of the instrument provides a convenient means of checking the correctness of the accounting, both from the standpoint of the workman and from the standpoint of the employer. The issue of the interest bearing savings certificates increases the bank's savings deposits by the amount of the savings certificates issued, and to the extent that the workmen to whom these certificates are issued or those to whom the workmen transfer them delay in presenting the certificates for payment, the bank will build up the amount of its savings deposits. Since these certificates of deposit are readily negotiable, they may pass from one person to another for many months or years before being presented to the bank for payment. While, of course, the bank must meet the payment, not for principal only, but of one of the larger amounts specified in the table, if the same has been held long enough, the amount payable at any time will be such that the bank will have held and used the principal amount of the fund at a profit to itself. Further, the combinations of value indicia and date indicia, mutually indexing one another, are such as to eliminate the computation of time or interest by the paying teller; thus conserving his time and the money involved in errors.

Further, the amount and date indicia may be arranged so as to greatly stimulate persons to hold the instruments for a given period, and thus greatly stimulate thrift on the part of thousands of employees who otherwise would not think of saving their money. The certificates thus become the means of thrift education as well as automatic deposit convassers.

Finally, the use of the certificates enables the depositary to readily adjust the compensation for the use of the depositor's money on a basis that represents different rates for different periods and affords the owner a return for the use of his money more equitably adjusted to the earning power of money as affected by seasonal or other customary changes in demand for money. Thus the certificate shown in the drawing indicates that the depositor will receive as much for his money during a period of three months during the late summer and early fall as he would receive for it for four months during the late fall and early winter, indicating the depositary recognizes the higher earning power of money in that community during the late summer and fall than during the late fall and early winter. The general use of my certificates properly adjusted to seasonal and other customary causes of interest fluctuations will preserve bank deposits during ordinarily stringent periods and thus avoid or lessen the disturbance of loans and commerce usually concurrent with higher interest rates.

It is apparent that the wording of the several sections and features of my invention may be varied without departing from the spirit of the invention.

What I claim as new and desire to secure by Letters Patent is:

1. In an instrument of the class described, the combination with a certificate of obligation embodying value indicia representing progressively increasing predetermined fixed amounts each representing the value of the certificate during one of the consecutive periods or intervals and date spaces associated with the value indicia and so positioned relative to the value indicia that each of the date spaces but one indexes two of the value indicia and that each of the value indicia but one indexes two of the date spaces, of a bank check form detachably secured to the said certificate, the bank check form being imprinted with the amount of the principal represented by the said certificate of obligation.

2. In an instrument of the class described, the combination with a certificate of obligation embodying value indicia representing progressively increasing predetermined fixed amounts each representing the value of the certificate during one of the consecutive periods or intervals and date spaces associated with the value indicia and so positioned relative to the value indicia that each of the date spaces but one indexes two of the value indicia and that each of the value indicia but one indexes two of the date spaces, of a bank check form detachably secured to the said certificate, and a statement form detachably secured to the said check form and the said certificate of obligation, the bank check form and the statement form being imprinted with the amount of the principal represented by the said certificate of obligation.

3. In an instrument of the class described, the combination with a certificate of obligation embodying value indicia representing progressively increasing predetermined fixed amounts each representing the value of the certificate during one of the consecutive periods or intervals and date spaces associated with the value indicia and so positioned relative to the value indicia that each of the date spaces but one indexes two of the value indicia and that each of the value indicia but one indexes two of the date spaces, of a bank check form detachably secured to the said certificate, a statement form detachably secured to the said check form and the said certificate of obligation, and a receipt form detachably secured to the said check form, statement form and certificate of obligation.

4. In an instrument of the class described, the combination with a certificate of obligation embodying value indicia representing progressively increasing predetermined fixed amounts each representing the value of the certificate during one of the consecutive periods or intervals and date spaces associated with the value indicia and so positioned relative to the value indicia that each of the date spaces but one indexes two of the value indicia and that each of the value indicia but one indexes two of the date spaces, of a bank check form detachably secured to the said certificate, a statement form detachably secured to the said check form and the said certificate of obligation, and a receipt form detachably secured to the said check form, statement form and certificate of obligation, the said bank check form and receipt form being imprinted with the amount of the principal represented by the said certificate of obligation.

5. In an instrument of the class described, the combination with a certificate of obligation embodying value indicia representing progressively increasing predetermined fixed amounts each representing the value of the certificate during one of the consecutive periods or intervals and date spaces associated with the value indicia and so positioned relative to the value indicia that each of the date spaces but one indexes two of the value indicia and that each of the value indicia but one indexes two of the date spaces, of a bank check form detachably secured to the said certificate, a statement form detachably secured to the said check form and the said certificate of obligation, and a receipt form detachably secured to the said check form, statement form and certificate of obligation, the said receipt form being provided with a space designated for the reception of a finger imprint of identification, and the said bank check form, statement form and receipt form being imprinted with the amount of the principal represented by the said certificate of obligation.

6. In an instrument of the class described, the combination with a certificate of obligation embodying value indicia representing progressively increasing predetermined fixed amounts each representing the value of the certificate during one of the consecutive periods or intervals and date spaces associated with the value indicia and so positioned relative to the value indicia that each of the date spaces but one indexes two of the value indicia and that each of the value indicia but one indexes two of the date spaces, of a bank check form detachably secured to the said certificate, and a receipt form detachably secured to the said certificate.

7. In an instrument of the class described, the combination with a certificate of obligation embodying value indicia representing progressively increasing predetermined fixed amounts each representing the value of the certificate during one of the consecutive periods or intervals and date spaces associated with the value indicia and so positioned relative to the value indicia that each of the date spaces but one indexes two of the value indicia and that each of the value indicia but one indexes two of the date spaces, of a bank check form detachably secured to the said certificate, and a receipt form detachably secured to the said certificate, the said receipt form being provided with a space designated for the reception of a finger imprint of identification.

8. In an instrument of the class described, the combination with a certificate of obligation embodying value indicia representing progressively increasing predetermined fixed amounts each representing the value of the certificates during one of the consecutive periods or intervals and date spaces associated with the value indicia and so positioned relative to the value indicia that each of the date spaces but one indexes two of the value indicia and that each of the value indicia but one indexes two of the date spaces, of a bank check form detachably secured to the said certificate, and a receipt form detachably secured to the said certificate, the said check form and the said receipt form being imprinted with the amount of the principal represented by the said certificate of obligation.

9. In an instrument of the class described, the combination with a certificate of obligation, of a bank check detachably secured to the said certificate, both the certificate of obligation and the bank check being provided with value indicia representing progressively increasing predetermined fixed amounts each representing the value of the certificates during one of the consecutive periods or intervals and date spaces associated with each of the sets of value indicia, and each set of date spaces being so positioned relative to the associated set of value indicia that each of the date spaces but one of each set indexes two of the associated value indicia and that each of the value indicia but one of each set indexes two of the associated date spaces.

10. In an instrument of the class described, the combination with a certificate of obligation, of a bank check detachably secured to the said certificate, both the certificate of obligation and the bank check being provided with value indicia representing progressively increasing predetermined fixed amounts each representing the value of the certificate during one of the consecutive periods or intervals and date spaces associated with each of the sets of value indicia, and each set of date spaces being so positioned relative to the associated set of value indicia that each of the date spaces but one of each set indexes two of the associated value indicia and that each of the value indicia but one of each set indexes two of the associated date spaces, and the said bank check being imprinted with the amount of the principal represented by the said certificate of obligation.

In witness whereof, I hereunto subscribe my name this 19th day of February, A. D. 1914.

JOHN E. HANZLIK.

Witnesses:
   L. H. HANZLIK,
   F. W. HALL.